Aug. 8, 1961  R. W. KRUEGER  2,995,614
FLAT CELL AND MANUFACTURE THEREOF
Filed April 16, 1958

INVENTOR
RALPH W. KRUEGER
BY
ATTORNEY

United States Patent Office

2,995,614
FLAT CELL AND MANUFACTURE THEREOF
Ralph W. Krueger, Rocky River, Ohio, assignor to Union Carbide Corporation, a corporation of New York
Filed Apr. 16, 1958, Ser. No. 728,822
14 Claims. (Cl. 136—111)

This invention relates to a new and improved flat primary galvanic cell and a method of making the same, and more particularly relates to a new and improved method for the continuous assembly of an envelope cell.

A flat primary galvanic cell in which the cell elements are enclosed within a flexible plastic film envelope and a method of making the same have been developed recently. This type of cell is enclosed within a laminated envelope composed of flexible cathode collector material, conductive foil and non-conductor wrapping film. Generally, the cells are made by a method which comprises the co-linear feed of wrapping film, foil and flexible cathode collector material in such a manner as to have each layer placed on top of the next preceding layer. The cell elements, i.e. mix cake, anode, and a second mix cake are placed on the cathode collector, and another layer of cathode collector, foil and wrapping film is provided on the second mix cake and sealed to the first layer. While this is an excellent method of manufacture, in that the operation is continuous and well adapted to mass production techniques, certain drawbacks have been found to accompany production.

For example, if the cell is made by co-linear feed of all its elements, with subsequent heat sealing of the outer wrapping film, foil and cathode collector material on top of the anode and mix cakes to identical film, foil and cathode collector material below the mix cakes and anode, the heat seal must be made through a number of layers of material and the number of layers is different at different places in the marginal seal. Thus in some places there are two layers, in others four, and in still others, six layers. Because of the thickness of layers, it sometimes happens that before the cathode collector strips become sealed, the heat is so intense on the outside layers as to cause them to melt. It may well be seen that this is undesirable and should be kept to a minimum in order to insure proper cell and battery formation.

It is an important object of this invention to overcome these drawbacks and to provide an improved method of continuously manufacturing flat cells.

It is another object of this invention to provide a method of manufacturing flat cells whereby a reduced number of layers of material need be heat sealed to fully enclose the cell.

It is a further object of this invention to provide an improved method of manufacturing flat primary galvanic cells which avoids melting the wrapping envelope when heat sealing the cell.

A still further object of this invention is to provide a new and improved flat cell.

Figure 1:
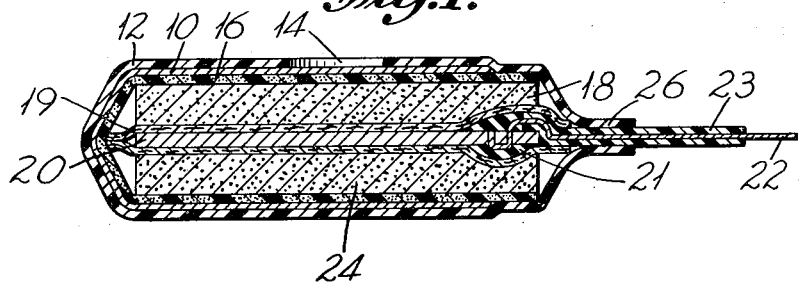
FIG. 1 is a vertical section of a cell made in accordance with this invention.
Figure 2:
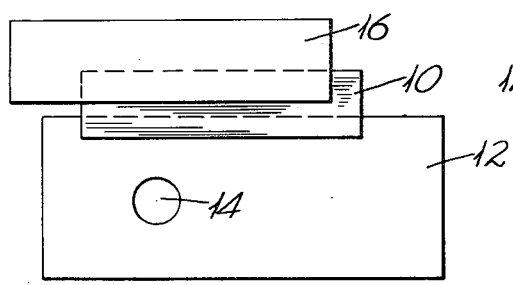
FIG. 2 is an exploded view of components of a cell envelope made in accordance with this invention.

The invention comprises an improved method of manufacturing flat dry cells of the type in which the cell elements are sealed within a flexible envelope which, in addition to sealing the cell, provides a flexible cathode collector for it. In the method of the invention film-type cathode collector material is laminated to film-type wrapping material in such position that a margin of wrapping material is provided about the entire periphery of the cathode collector material. A portion of the cathode collector material is then covered with a depolarizer mix cake which in turn supports an anode wrapped in separator material and having an electrical lead extending therefrom. A second depolarizer mix cake is placed atop the wrapped anode, and the laminate, comprising wrapping material and cathode collector, is folded over the cell elements. The cell is then sealed, suitably by a heat seal, along the periphery of the wrapping material so that the cell elements are completely enclosed thereby.

A flat cell according to this invention includes an anode sheet, cathode-depolarizer on each side of the anode separated therefrom by immobilized electrolyte, and a flexible conductive cathode collector leakproofedly sealed to a flexible film form insulating outer envelope. The conductive cathode collector is in contact with the cathode-depolarizer mix and is positioned between the cathode-depolarizer mix and the outer envelope. All the cathode-depolarizer mix and the outer envelope. All the components of the flat cell described above are totally enclosed in the outer envelope by the outer envelope being folded around the cell elements and sealed solely to itself in the meeting portions thereof. External contact to the cell is facilitated by providing an aperture in the outer envelope adjacent to the cathode-collector but in leakproof relation to the cell elements, and by providing an electrical conductor leading from the anode through the outer envelope seal.

More specifically, the invention comprises a method of manufacturing flat dry cells adapted to the continuous production of such cells. A web or strip of non-conductive, film-type wrapping material is provided and transverse segments of film-type cathode collector material are placed at appropriate intervals thereon sufficiently spaced apart to provide room for sealing between cells. These segments are marginally sealed, suitably by heat sealing methods, to the wrapping film to form a "laminate." Preferably a strip of electrically conductive foil, for example of aluminum, is placed between the cathode collector material and wrapping film. At successive stations the other cell elements are applied, first a depolarizer mix cake wet with electrolyte in contact with a portion of the cathode collector material, next an anode provided with a separator, and preferably a second cake of depolarizer mix. When all the cell elements are in place, the laminate is folded in such manner as to bring that portion of the collector material not covered by the cell elements into contact with the uppermost cell element. The margins of wrapping film about the cell are then sealed to each other, preferably by heat sealing, to enclose the completed cell within an envelope of electrically non-conductive material.

Figure 4:
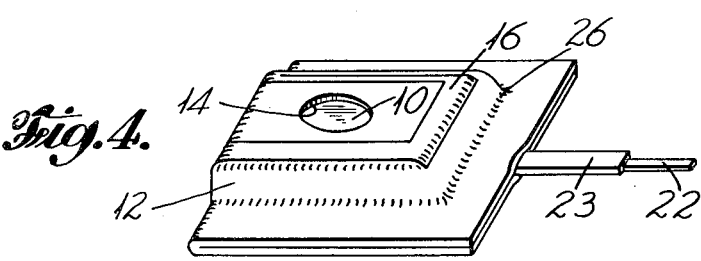
FIG. 4 is an isometric view of a single cell made in accordance with this invention.

Referring to FIG. 1 of the drawing, a cell made in accordance with this invention is there shown. It comprises conductive foil 10 between laminated layers of wrapping film 12 and cathode collector 16, the film 12 having an aperture 14 therein connecting with the foil segment 10 and through which contact may be made to the foil 10. Enclosed within the laminate is an anode 20, wrapped in separator film 19 and having an electrical lead 22 attached thereto, on both sides of which are disposed two electrolyte-wet depolarizer-mix cakes 18 and 24. The lead 22 is provided with electrical insulation 23. A sealing material 21 is provided over the lead 22 where it is attached to the anode 20 and the separator material 19 forms a barrier between the lead 22 and the mix cakes 18 and 24. The wrapping film 12 forms the outer envelope for the cell and completely encloses it, the marginal portions of the film 12 being sealed, preferably by means of a heat seal about the periphery of the cell as best shown at 26 in FIG. 4. The insulated electrical lead 22 protrudes from the seal as shown.

Figure 3:
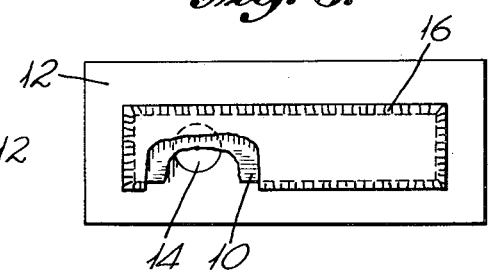
FIG. 3 is a plan view of the wrapping envelope laminate of this invention, part being broken away.

By reference to FIG. 3 it may be seen that the cathode collector 16 has dimensions slightly larger than the conductive foil 10 and it overlaps the foil 10 to a sufficient extent that it may be suitably laminated, as by a heat seal or by pressure sensitive cement, to the wrapping film 12 and enclose the foil 10 within the laminate without sealing through or to the foil 10.

Figure 5:
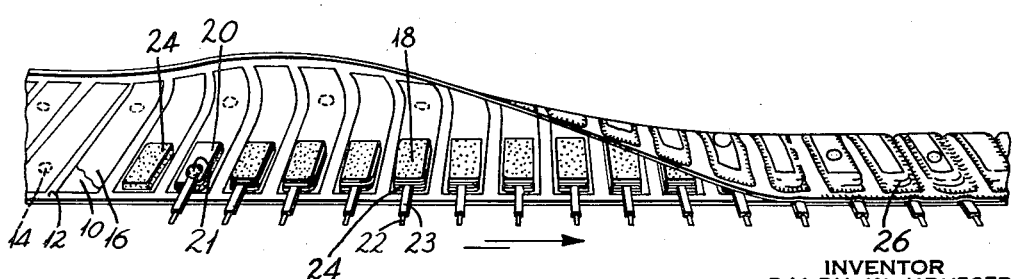
FIG. 5 is a schematic representation of the continuous assembly of flat cells by the techniques of this invention.

FIG. 5 shows the adaptability of the method of this invention to mass production techniques. The wrapping film 12 is in the form of a long continuous strip and has apertures 14 provided therein at regular intervals. In the accompanying figure, the apertures are shown as alternating from one side of the cell to the other. This facilitates assembly into a series connected battery stack without cutting the strip apart. Similarly, the apertures may be placed for parallel assembly or for series-parallel battery formation.

The conductive foil segments 10 are laid on the film 12 transverse to the film length in such manner as to provide access thereto through the aperture 14. The flexible cathode collector 16 is placed overlapping the foil and marginally sealed, suitably by the application of heat and pressure, to the wrapping film 12 thereby forming a laminate. The anode 20, with an insulated electrical lead 22 connected thereto, has mix cakes 18 and 24 disposed on either side thereof and is separated from the mix cakes by separator material 19. This assembly is placed on about one-half of the cathode collector 16 and the remainder of the cathode collector-wrapping film laminate is then folded over this assembly and suitably sealed around the periphery of the laminate, as by heat sealing, to the unfolded portion of the laminate to form a moisture tight envelope totally enclosing the cell. The insulated lead 22 is covered with a moistureproof sealing material 21, such as vinyl cement or asphalt, at the point where it makes contact with the anode. At the point where the insulated lead wire 22 comes through the envelope, the laminate is sealed to and through the insulation 23 to insure a moisturetight seal all the way around the cell.

It is evident from the above description that this method of manufacture alleviates the major disadvantage of the prior construction, referred to above, in that the final envelope heat seal is accomplished through only two layers of film except at the point where the insulated lead protrudes through the envelope. The heat sealing may therefore be accomplished without melting the outside layers while heating the inner layers to sealing temperature.

Voltage tests, after fourteen days of storage, were made on stacks of cells of the prior construction and on stacks of cells made in accordance with this invention. The frequency of occurrence of subnormal voltage readings obtained after a period of storage is considered to be a reasonably good indication of the frequency of occurrence of individual cells which have not been completely sealed and which have lost excessive amounts of moisture. Such tests on stacks representing more than 10,000 cells of each construction showed that by this invention, the frequency of occurrence of inadequately sealed cells had been reduced to less than one fourth of that obtained with the prior construction.

In addition to this outstanding quality advantage, there is an average of 6.9 percent saving of material by the method of the invention over the prior method of manufacture. Further, this method is still admirably adapted to mass production techniques and assembly line operation so that none of the advantages of the prior method are lost by the quality improvements and cost savings introduced herewith.

The method herein described is particularly well adapted to the manufacture of flat primary galvanic cells of the Leclanche' type utilizing a polyvinyl chloride wrapping film and a carbon-impregnated vinyl film cathode collector. While the above materials are preferred, any flexible, electrically insulating, liquid impervious, gas venting material may be used as wrapping film, as for example, vinyl resins, halogenated rubber, vinylidene resins, cellulose derivatives, polyethylene and polyesters of a glycol and terphthalic acid. These same materials, or any one of them, made conductive by conventional means, may also be used as cathode collector. It is an important consideration in the choice of materials to be used, that all the components be compatible, but with this restriction observed, any combination of the above materials may be used for wrapping film and cathode collector. The anode is preferably zinc, the depolarizer manganese dioxide, and the electrolyte ammonium chloride, but anodes of magnesium, aluminum or manganese with the proper respective electrolytes and depolarizers may conveniently be used. The metal foil is suitably aluminum, but may be any desired metal, and an electrical lead made of tinned brass connected to the anode has been found to work well, though any metal that will not form a detrimental couple with the anode may be conveniently used. Suitably, the anode may be in sheet, grid, or powder form and may be wrapped with any bibulous separator material, as for instance, paper coated with methyl cellulose.

The cells made by the method of this invention may be stacked into batteries of the series, parallel, or series-parallel variety. They may be deformed, such as in an arcuate or circular shape, so as to be adapted to fit any particular application.

What is claimed is:

1. The method of manufacturing a substantially flat primary galvanic cell which comprises providing an electrically non-conductive, flexible, film-form wrapper for said cell having an aperture therein, marginally sealing a flexible, electrically-conductive film-form cathode collector to said wrapper thereby forming a laminate wherein a minor portion of said wrapper extends peripherally beyond said collector and said aperture communicates with said collector, providing on said collector electrolyte-wet depolarizer mix and a consumable anode sheet having an electrical lead connected thereto, said depolarizer so arranged as to be adjacent both sides of said anode sheet, folding said laminate over said mix, and sealing together the marginal portions of said wrapper.

2. The method of manufacturing substantially flat primary galvanic cells which comprises providing segments of conductive foil spaced intermittently on a continuous strip of non-conductive wrapping film having apertures therein communicating with said conductive foil, said foil being transverse to said film length and shorter than said film width, covering said foil with segments of flexible electrically conductive cathode collector material overlapping said foil, marginally sealing said cathode collector material around said foil to said wrapping film thereby forming a laminate, placing two electrolyte-wet depolarizer mix cakes and a consumable anode sheet having an electrical lead connected thereto on said segment of cathode collector material, each of said mix cakes being adjacent one side of said anode sheet folding said laminate over said mix cakes, and sealing together meeting portions of said wrapping film which extend beyond said segments of cathode collector.

3. The method of manufacturing flat primary galvanic cells which comprises providing segments of conductive aluminum foil spaced intermittently on a continuous strip of non-conductive vinyl wrapping film having apertures therein, said foil being transverse to said wrapper length, shorter than said wrapper width and accessible through said aperture, covering said foil with segments of electrically conductive flexible cathode collector material overlapping said foil, said cathode collector being vinyl film containing powdered carbon therein to provide conductivity thereto, said cathode collector material being shorter than the width of said wrapping film and longer than said foil, marginally sealing said cathode collector material around said foil to said wrapping film thereby forming a laminate, placing two electrolyte-wet depolarizer mix cakes and a consumable anode sheet having an insulated electrical lead attached thereto on a portion of said cathode collector segment, each of said mix cakes being adjacent one side of said anode sheet, folding said laminate over said mix cakes, and sealing together meeting portions of said wrapping film.

4. The method of manufacturing substantially flat primary galvanic cells which comprises providing segments of conductive aluminum foil spaced intermittently on a continuous strip of non-conductive vinyl wrapping film having apertures therein, said foil being transverse to said wrapper length, shorter than said wrapper width and being accessible through said aperture, covering said foil with segments of flexible cathode collector material composed of a vinyl film impregnated with carbon and having larger dimensions than said foil segment, marginally sealing said cathode collector material around said foil to said wrapping film by heat sealing thereby forming a laminate, placing two depolarizer mix cakes and a consumable zinc anode sheet having an electrical lead connected thereto on a portion of said cathode collector segment, each of said mix cakes being adjacent one side of said anode sheet and separated therefrom by an electrolyte-wet separator layer therebetween, folding said laminate over said mix cakes, and heat sealing together the metting portions of said wrapping film.

5. A method of manufacturing a battery of substantially flat primary galvanic cells which comprises providing segments of conductive foil spaced intermittently on a continuous strip of non-conductive wrapping film having apertures therein, covering said foil with segments of flexible cathode collector material having larger dimensions than said foil, said foil and cathode collector material segments being transverse to said wrapper length and shorter than said wrapper width, marginally heat sealing said cathode material around said foil to said wrapping film thereby forming a laminate, placing two electrolyte-wet depolarizer mix cakes and a consumable anode sheet having an insulated electrical lead connected thereto on a portion of said cathode collector segment, each of said mix cakes being adjacent one side of said anode sheet folding said laminate over said mix cakes, sealing together the meeting portions of said wrapping film, stacking said cells with said folded edges adjacent to one another and inserting each lead into the aperture of the next succeeding cell.

6. The method of manufacturing a battery of substantially flat primary galvanic cells which comprises providing segments of conductive foil spaced intermittently on a continuous strip of wrapping film having apertures therein, covering said foil with segments of flexible cathode collector material having larger dimensions than said foil, said segments being transverse to said wrapper length, and shorter than said wrapper width and accessible through said aperture, marginally heat sealing said cathode collector material around said foil to said wrapping film, placing two electrolyte-wet depolarizer mix cakes and a consumable anode sheet having an insulated electrical lead attached thereto on a portion of said cathode collector segment, each of said mix cakes being adjacent to one side of said anode sheet, folding said laminate over said mix cakes, sealing together the meeting portions of said wrapper, stacking said cells thus formed with said leads from each cell protruding in the same direction, joining said leads to a first common conductive terminal, and connecting said foil segments through said apertures to a second common conductive terminal.

7. The method of manufacturing a substantially flat primary galvanic cell which comprises providing a segment of conductive foil on a layer of wrapping film having an aperture therein, said segment being shorter and narrower than said film, covering said foil with a strip of flexible cathode collector material having dimensions intermediate between said film and said foil segment, laminating said cathode collector material around said foil to said wrapping film, placing two electrolyte-wet depolarizer mix cakes and a consumable anode sheet having an electrical lead attached thereto on said segment, each of said mix cakes being adjacent one side of said anode and separated therefrom by a separator layer therebetween, folding said laminate over said mix cakes and sealing together the meeting portions of said film.

8. In the method of manufacturing substantially flat primary galvanic cells comprising the steps of providing depolarizer mix cakes on each side of a consumable anode sheet which has an electrical lead extending therefrom, placing a flexible cathode collector material around said depolarizer mix cakes, and enclosing the cell elements within a non-conductive wrapper which has an aperture therein communicating with said cathode collector; the improvement comprising providing a cathode collector of smaller dimensions than said wrapper, sealing said cathode collector to said wrapper thereby allowing said wrapper to overlap said cathode collector, placing said mix cakes and said anode on a portion of said cathode collector, folding the remainder of said cathode collector and wrapper over said mix cakes, and sealing the meeting overlapping portions of said wrapper around said mix-covered anode.

9. In the method of manufacturing substantially flat primary galvanic cells comprising the steps of providing depolarizer mix cakes on each side of a consumable anode sheet which has an electrical lead extending therefrom, placing a conductive, flexible cathode collector material around said depolarizer mix, and enclosing the cell elements within a non-conductive wrapper which has an aperture therein communicating with said cathode collector; the improvement comprising providing a cathode collector of smaller dimensions than said wrapper, interspersing a strip of conductive foil having dimensions smaller than said cathode collector between said wrapper and said cathode collector marginally sealing said cathode collector around said foil to said wrapper thereby allowing said wrapper to overlap said cathode collector, placing said depolarizer mix cakes and said anode on a portion of said cathode collector, folding the remainder of said cathode collector and said wrapper over said mix cakes, and sealing the meeting overlapping portions of said wrapper around said mix-covered anode.

10. A substantially flat primary galvanic cell comprising an anode sheet having an electrical conductor extending therefrom, cathode-depolarizer mix cakes on both sides of said anode sheet and separated therefrom by an immobilized electrolyte, a flexible film-form moisture impervious conductive cathode-collector in contact with said depolarizer mix and leakproofedly sealed to a flexible film-form moisture impervious insulating cell envelope having an aperture therein communicating with said cathode-collector, said envelope overlapping said cathode-collector in all dimensions, said cell being totally enclosed in said envelope by a seal formed solely in said overlapping portions of said envelope, said conductor extending through said seal in leakproof relation thereto.

11. A substantially flat primary galvanic cell comprising a metal anode sheet having an electrical conductor extending therefrom, cathode-depolarizer mix cakes on both sides of said anode and separated therefrom by an electrolyte impregnated bibulous material, a flexible film-form moisture impervious conductive cathode-collector in contact with both of said mix cakes and leakproofedly sealed to a flexible film-form moisture impervious insulating cell envelope having an aperture therein communicating with said cathode-collector, said envelope overlapping said cathode-collector in all dimensions, said cell being totally enclosed in said envelope by a seal formed solely in said overlapping portions of said envelope, said conductor extending through said seal in leakproof relation thereto.

12. A substantially flat primary galvanic cell comprising a substantially flat metal anode having an insulated electrical conductor extending therefrom, cathode-depolarizer mix cakes on both sides of said anode and separated therefrom by an electrolyte impregnated paper separator, a flexible film-form moisture impervious conductive cathode-collector in contact with both of said mix cakes and leakproofedly sealed to a flexible film-form moisture impervious insulating cell envelope having an aperture therein communicating with said cathode-collector and a thin conductive foil disposed between said cathode-collector and said cell envelope adjacent aperture, said cell envelope overlapping said cathode-collector in all dimensions, said cell being totally enclosed in said envelope by a seal formed solely in said overlapping portions of said envelope, said conductor extending through said seal in leakproof relation thereto.

13. A battery of substantially flat primary galvanic cells each of which comprises a flat anode having an electrical conductor extending therefrom, cathoe-depolarizer mix cakes on both sides of said anode and separated therefrom by an immobilized electrolyte, a flexible film-form moisture impervious conductive cathode-collector in contact with said depolarizer mix and leakproofedly sealed to a flexible film-form moisture impervious insulating cell envelope having an aperture therein communicating with said cathode-collector, said envelope overlapping said cathode-collector in all dimensions, said cell being enclosed in said envelope by a seal formed solely in said overlapping portions of said envelope, said conductor extending through said seal in leakproof relation thereto, said conductor of each of said cells being inserted into said aperture of each adjacent cell thereby contacting said cathode-collector of such adjacent cell and thus forming a series connected battery.

14. A battery of substantially flat primary galvanic cells each of which comprising a flat anode having an electrical conductor extending therefrom, cathode-depolarizer mix cakes on both sides of said anode and separated therefrom by an immobilized electrolyte, a flexible film-form moisture impervious conductive cathode-collector in contact with said depolarizer mix and leakproofedly sealed to a flexible film-form moisture impervious insulating cell envelope having an aperture therein communicating with said cathode-collector, said envelope overlapping said cathode-collector in all dimensions, said cell being enclosed in said envelope by a seal formed solely in said overlapping portions of said envelope, said conductor extending through said seal in leakproof relation thereto, said conductor of each of said cells being connected to a first common conductive terminal and a second common conductive terminal being connected to said cathode-collectors of each cell through said apertures thus forming a parallel connected battery.

References Cited in the file of this patent

UNITED STATES PATENTS

| | | |
|---|---|---|
| 2,519,053 | Reinhardt | Aug. 15, 1950 |
| 2,745,894 | Nowotny | May 15, 1956 |
| 2,870,235 | Soltis | Jan. 20, 1959 |